J. MURCHIE.
WELDING TABLE.
APPLICATION FILED AUG. 27, 1920.

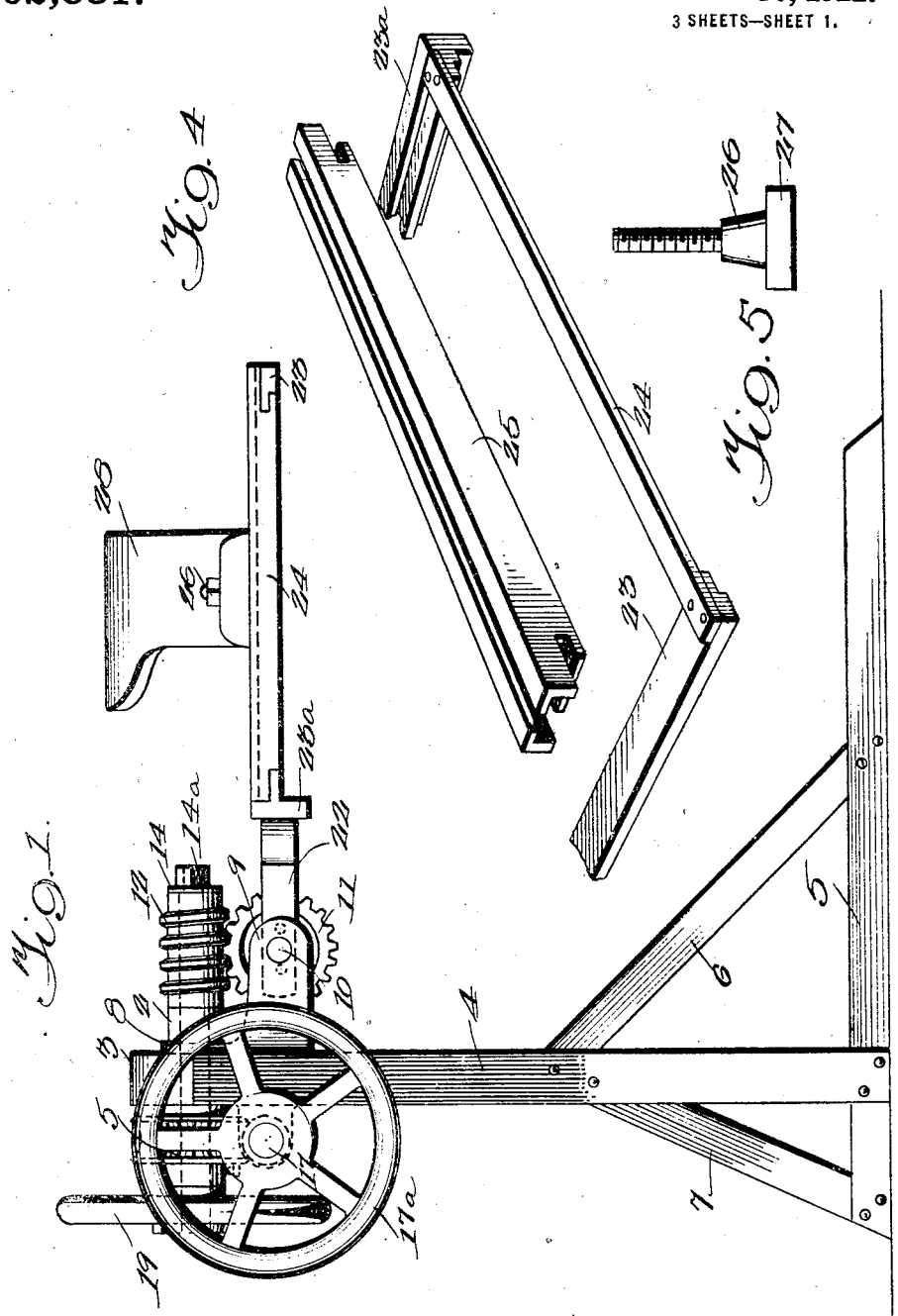

1,402,881.

Patented Jan. 10, 1922.
3 SHEETS—SHEET 2.

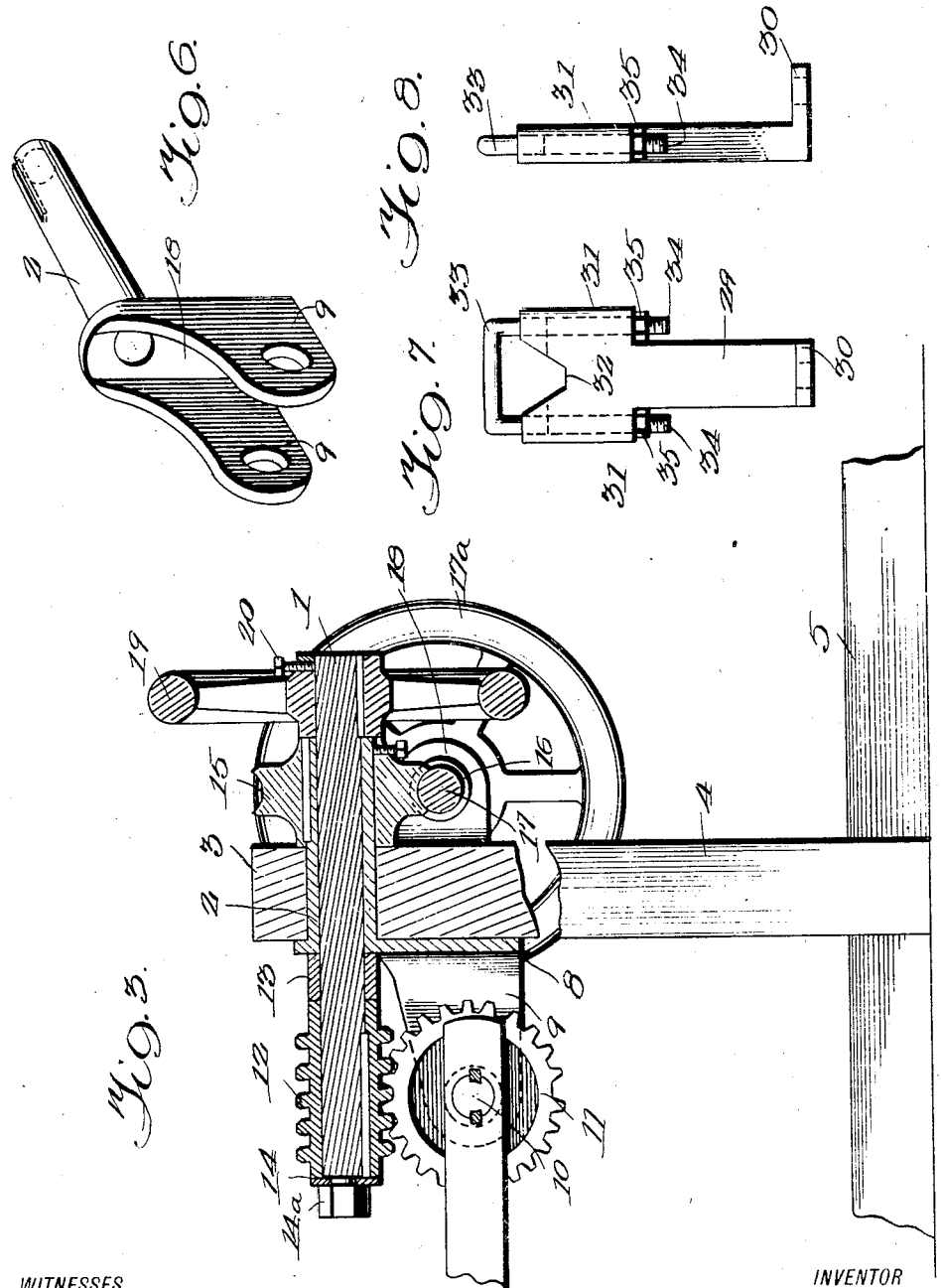

UNITED STATES PATENT OFFICE.

JAMES MURCHIE, OF TUPPER LAKE, NEW YORK.

WELDING TABLE.

1,402,881.  Specification of Letters Patent.  Patented Jan. 10, 1922.

Application filed August 27, 1920. Serial No. 406,475.

*To all whom it may concern:*

Be it known that I, JAMES MURCHIE, a citizen of the United States, and a resident of Tupper Lake, in the county of Franklin and State of New York, have invented certain new and useful Improvements in Welding Tables, of which the following is a specification.

My invention is an improvement in welding tables, and has for its object to provide a table of the character specified, especially adapted for oxy-acetylene welding wherein the table is so mounted that it may be inclined at any desired angle, with either face upward, and may be held in adjusted position without the possibility of accidental displacement.

In the drawings:

Figure 1 is a front view of the improved table,

Figure 2 is a plan view,

Figure 3 is an enlarged vertical central section with the table removed,

Figure 4 is a perspective view of a portion of the table with one of the bolt slides, Figure 5 is a side view of one of the bolts, Figure 6 is a perspective view of the bearing and its bracket, Figure 7 is a front view of an attachment to be used in welding crank shafts, Figure 8 is a side view of the same.

A shifting shaft 1 is journaled in a sleeve 2 which is mounted in a bearing 3 supported by standards 4, the said standards each having a base 5 against which the standard is braced by inclined braces 6 and 7. The standards incline inwardly toward the bearing, and are connected by the bearing, and the sleeve 2 has a depending portion 8 which carries a pair of bearing lugs 9, in which is journaled a worm gear shaft 10.

A worm gear 11 is secured to this shaft, and the said gear meshes with a worm 12 keyed to the shaft 1, a collar 13 being arranged between the gear and the bearing 2. A washer 14 is arranged at the end of the worm 12, and the bearing, and a nut 14ª is threaded onto the shaft outside of the washer. The collar 13 and the washer 14 are preferably of brass. A worm wheel 15 is keyed to the sleeve 2 at the opposite side of the bearing 3 from the worm 12, and this worm wheel 15 meshes with a worm 16 on a shaft 17 which is journaled in a bearing lug 18 extending from one of the standards. A wheel 17ª is secured to the outer end of this shaft. The shaft 1 also carries a shifting wheel 19 which is keyed to the shaft, and also held by a set screw 20. The shaft 10 before mentioned is keyed to a pair of arms 22 extending from a frame which is composed of side members 23 and 23ª, the arms 22 extending from the member 23ª, and connecting cross members 24 for connecting the ends of the members 23—23ª.

The arms 22 are arranged on opposite sides of the worm wheel 11 before mentioned. This frame carries a series of guides 25, each of which is channel shaped, the side walls of the channels having inwardly extending flanges at their tops, as clearly shown in Figure 4. Bolts 26 are mounted to slide in the guides, the bolts having square extensions 27 at their heads, which move in the channels of the guides. Referring to Figure 4 it will be seen that the guides have their ends recessed to receive the side members 23—23ª, the arrangement being such that the bottoms of the channels of the guides 25 are below the side members, and the ends of the side walls of the guides extend flush with the outer face of the side member 23, and abut against a rabbet on the side member 23ª.

This arrangement permits the guides to move laterally, or longitudinally of the table, to provide for contraction and expansion of the article being welded, and the bolts 26 are for securing the work indicated at 28 to the table. These bolt extensions 27 are slidable in the guides, so that the work may be adjusted where desired. The movable guides relieve the weld from any strain, the guides moving, to permit the work to remain in relatively fixed position.

In Figures 7 and 8 there is shown an attachment for use in welding crank shafts. The said attachment comprises a standard 29 having at its lower end a perforated foot 30, and having at each side edge of its upper end a vertical bearing sleeve 31. The upper end of the standard between the bearing sleeves is notched as shown at 32, and a staple comprising a body 33 and arms 34 is supported by the standard, the arms 34 extending into the bearing sleeves 31, and being engaged by nuts 35 below the said sleeves.

With the improved table, the work held thereon may be adjusted to any desired position by means of the hand wheels 17ª and 19. When the hand wheel 19 is turned, the gear wheel 11 is turned, and the table is swung upward or downward swinging with the shaft 10. When the hand wheel 17ª is turned the sleeve 2 is shifted, and the table is swung laterally to raise one side thereof and lower the other, that is to incline the plane of the table at right angles to its inclination when shifted by the wheel 19. The table may be turned entirely over if desired. The attachment shown in Figures 7 and 8 is connected to the bolts 26.

I claim:

1. A table comprising a support, a sleeve journaled in the support, a shifting shaft journaled in the sleeve, said sleeve carrying depending from one end thereof a pair of bearing lugs, a second shaft journaled in the lugs, a work supporting table having laterally extending arms keyed to the said second shaft, a worm gear connection between the said second shaft and the shifting shaft, means for turning the shifting shaft, means for turning the bearing sleeve independently of its shaft, said work supporting table having slidably connected thereto and movable longitudinally thereof and laterally with respect to the second or supporting shaft a series of guides, each guide having an under cut guideway in its upper face, and means movable in each guideway for connection with the work to support the same.

2. A table comprising a support, a sleeve journaled in the support, a shifting shaft journaled in the sleeve, said sleeve carrying depending from one end thereof a pair of bearing lugs, a second shaft journaled in the lugs, a work supporting table having laterally extending arms keyed to the second shaft, a worm gear connection between the said second shaft and the shifting shaft, means for turning the shifting shaft, and means for turning the bearing sleeve independently of the shifting shaft.

3. A welding table, comprising in combination with the table, of a shaft to which the table is rigidly connected to extend radially of the shaft, a support for the shaft mounted to oscillate on an axis at right angles to the axis of the shaft said support including a rotatable sleeve having spaced lugs in which said shaft is journaled, means for swinging said support, means for oscillating the shaft, and means is connection with each of the said means for holding it in adjusted position.

4. A welding table and a shaft to which the table is connected, the table extending radially from the shaft in one direction only and in substantially the plane of the shaft, means for supporting said shaft for oscillation on its axis, means for supporting said supporting means to oscillate on an axis transverse to that of the shaft, and independent means for oscillating the shaft and the support and for holding them in adjusted position.

5. A welding table comprising a frame, and a series of guides arranged transversely of the table and slidably connected therewith to move longitudinally thereof, and laterally with respect to each other, and means for detachably connecting the work to the guides, said attaching means comprising undercut guideways in the guides, headed bolts movable in the guideways, and nuts engaging the free end of said bolts and the work.

6. A welding table comprising a frame, and a series of guides arranged transversely of the table and slidably connected therewith to move longitudinally thereof on the cross members, and laterally with respect to each other, and adjustable means carried by such guides for detachably connecting the work to the guides.

JAMES MURCHIE.